April 9, 1940.  T. F. N. ALEXANDER  2,196,951
BRAKING OF WHEELED VEHICLES
Filed Feb. 11, 1939  4 Sheets-Sheet 1
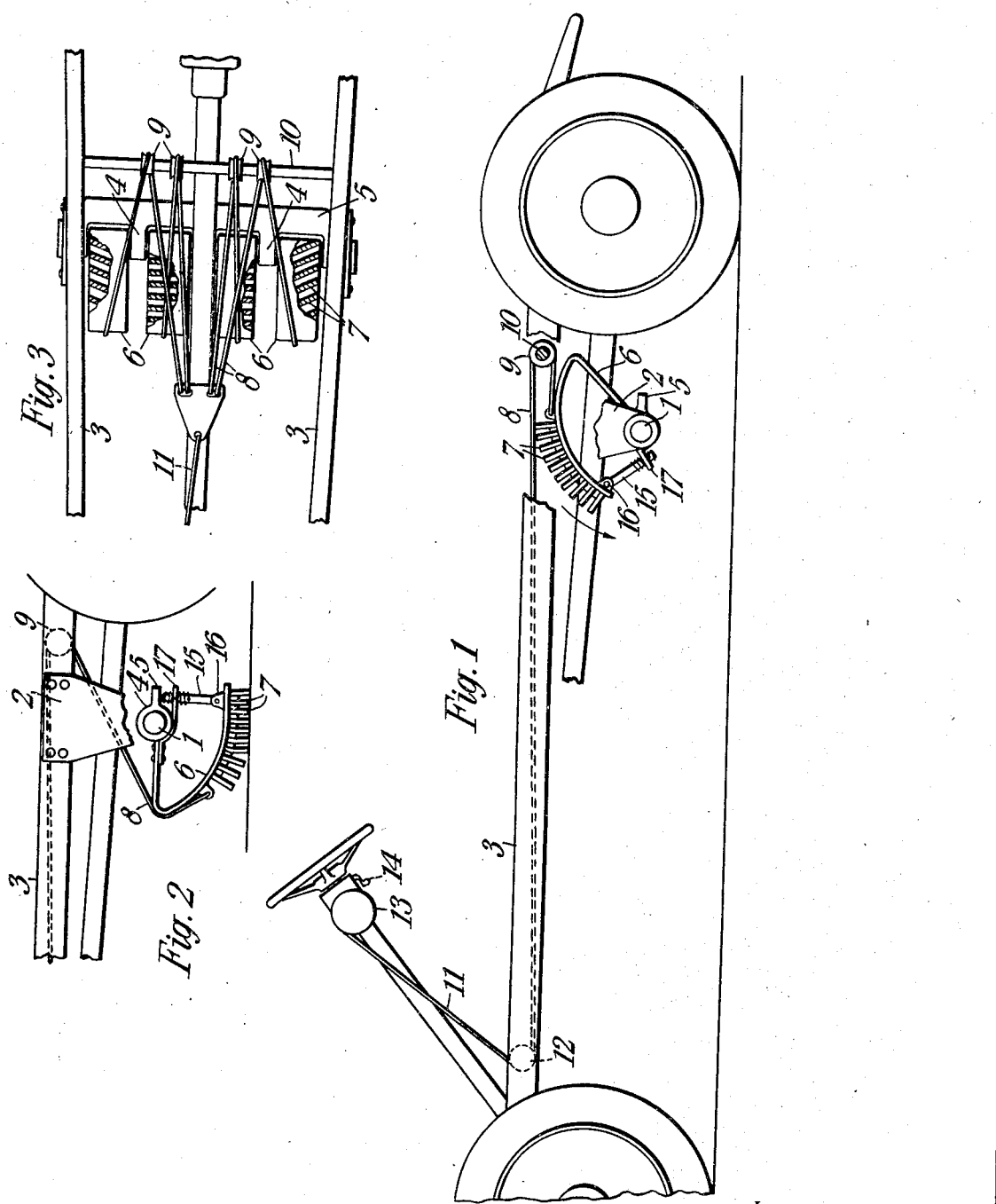
Inventor
Thomas Francis Math Alexander
by Dowell + Dowell
his Attorneys April 9, 1940.  T. F. N. ALEXANDER  2,196,951
BRAKING OF WHEELED VEHICLES
Filed Feb. 11, 1939  4 Sheets-Sheet 2

Inventor
Thomas Francis Neath Alexander
by Dowell & Dowell
his Attorneys

April 9, 1940. T. F. N. ALEXANDER 2,196,951
BRAKING OF WHEELED VEHICLES
Filed Feb. 11, 1939 4 Sheets-Sheet 3

Inventor
Thomas Francis Neath
Alexander
by Dowell & Dowell
His Attorneys

Patented Apr. 9, 1940

2,196,951

UNITED STATES PATENT OFFICE 2,196,951

BRAKING OF WHEELED VEHICLES

Thomas Francis Neath Alexander, Stoke Bishop, Bristol, England

Application February 11, 1939, Serial No. 255,993
In Great Britain February 19, 1938

4 Claims. (Cl. 188—5)

The braking of wheeled vehicles is a problem which has received much attention and has resulted in the development of many different systems each claiming to possess advantages for some particular type of stock and travel way for the wheels thereof.

In general however, apart from the magnetic track brake for electrically propelled railway or tramway vehicles it may be said that deceleration of a wheeled vehicle involves transmission entirely between the wheels and the associated track of forces which may be of widely varying character and magnitude. This is particularly noticeable in the case of modern traffic where highways are used by vehicles having pneumatic tyred wheels and relatively high speeds are permitted.

Attempts have been made to pivotally connect to a suitable part of a vehicle a member or members adapted to be brought into contact with the track or road surface by a manually operable or foot lever, the said member or members being so proportioned and shaped that the forward movement of the vehicle causes the said member or members to be pressed with increasing force on the track or road surface. Such means as heretofore proposed have been intended to act as the brake mechanism proper of a vehicle and most of the improvements have been directed to providing arrangements capable of resisting the great forces brought into play while the vehicle is travelling at a high speed. Violent braking in this manner, usually carried to the extent of lifting the tyres off the ground, I regard as fundamentally wrong because it does not prevent swerving or skidding.

It has also been proposed to employ brush-like devices to act as anti-skid means, their action upon the roadway being dependent upon force applied.

I supplement any ordinary effective braking system with means of the kind herein referred to modified to act as an auxiliary stabilizer that is to say designed in some cases to exert a preliminary drag on the vehicle and produce a certain lag before the ordinary braking system is used, by which means deviation of a vehicle from its proper course will be prevented or corrected. This lag has a most marked effect in securing a more stable application of front wheel braking.

For thus stabilising vehicles during braking, I, according to the invention, employ means of the kind in which retardation by dissipation of energy is effected through eccentric devices reacting between the vehicle and track with a force that increases automatically, and cause such devices to serve as carriers for resilient brush means adapted to secure smoothness of action, without which high speeds could not be safely dealt with.

The brushing means may be wire, strip metal or material known by the registered Trade Mark Ferrodo the strips upstanding from one end from the corner and if desired backed with flexible metal said carriers being furthermore potentially loaded mechanically as by springs or hydraulically where desired.

Where a brush extends transversely of a vehicle it may be either rigid from end to end or be built up of sections capable of self adjustment to suit road camber or irregularities.

The improved braking means is applicable to aeroplanes and to railway vehicles where it is possible to provide a suitable track between the rails.

In the accompanying drawings, Figs. 1, 2 and 3 illustrate one suitable arrangement according to the invention Fig. 1 being a side elevation showing in out-of-use position parts of the vehicle shown in Figs. 2 and 3 in side elevation and plan with the parts in brake applied position.

Figure 4:
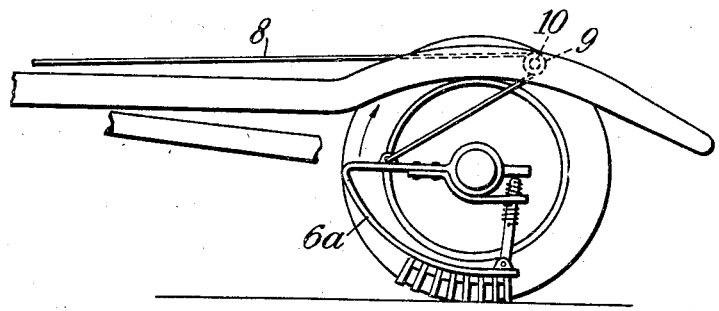
Figs. 4 and 5 are views similar to Figs. 2 and 3 of a modification.

Referring first to Figs. 1, 2 and 3, 1 represents a shaft carried by brackets 2 from a car chassis 3. The shaft 1 is stationary and passes through bosses 4 of a transverse beam 5 fixed to the chassis. Upon the shaft 1 are rotatably mounted four eccentrically shaped carriers 6 of spring steel. Each carrier is equipped with a brush 7 and harnessed to a flexible connection 8 passing around a sheave 9 on a cross shaft 10, the several connections 8 being coupled to a single flexible connection 11 leading around a sheave 12 to a ratchet and pawl controlled hand operable winding wheel 12. 14 represents a pawl releasing latch for said wheel 13. Each carrier 6 is further provided with a stem 15 pivoted at 16 and adapted to slide through a guide 17 which forms part of the carrier. Normally the parts occupy the position shown in Fig. 1. When the brake is to be applied the latch 14 is operated to release the wheel 13 whereupon the carriers 6 will by their own weight rotate in the direction of the arrow Fig. 1 until finally the position shown in Figs. 2 and 3 is reached, the stems 15 then abutting against the beam 5 to prevent flexure of the carriers beyond a certain degree. To return the braking means to normal position, the vehicle is first reversed and the wheel 13 then operated to wind up the flexible connections.

Figure 5:
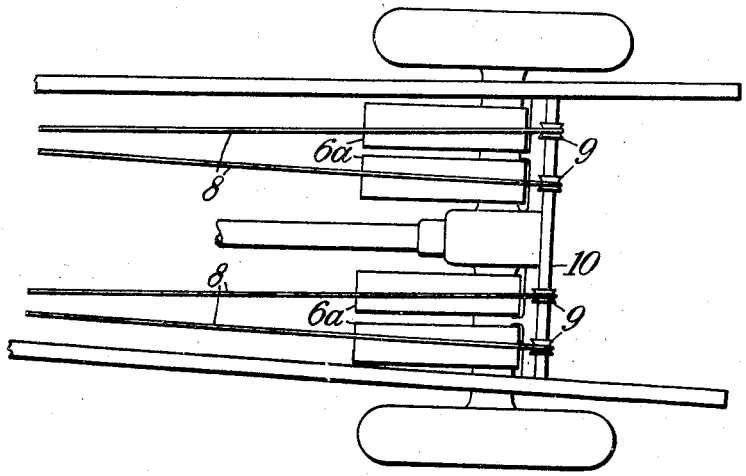

In the modification shown in Figs. 4 and 5 the carriers 6ª are mounted upon the rear axle of the vehicle.

Figure 6:
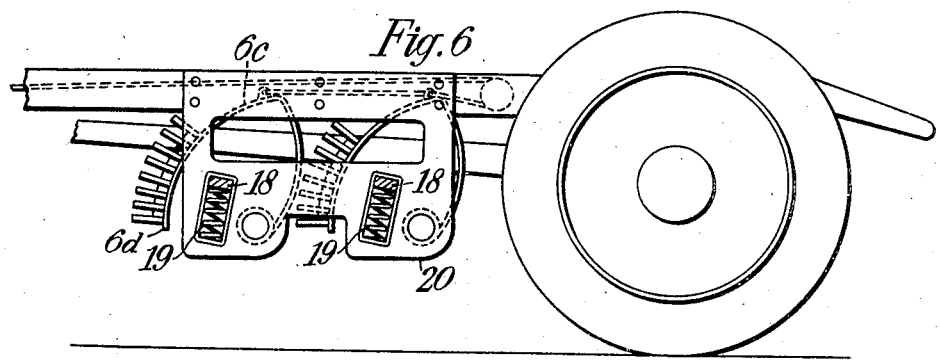
Figs. 6, 7 and 8 are also similar views of another embodiment.
Figure 7:
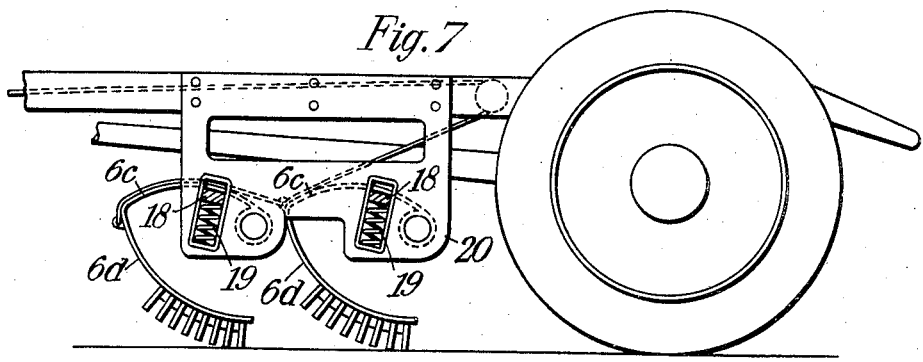
Figure 8:
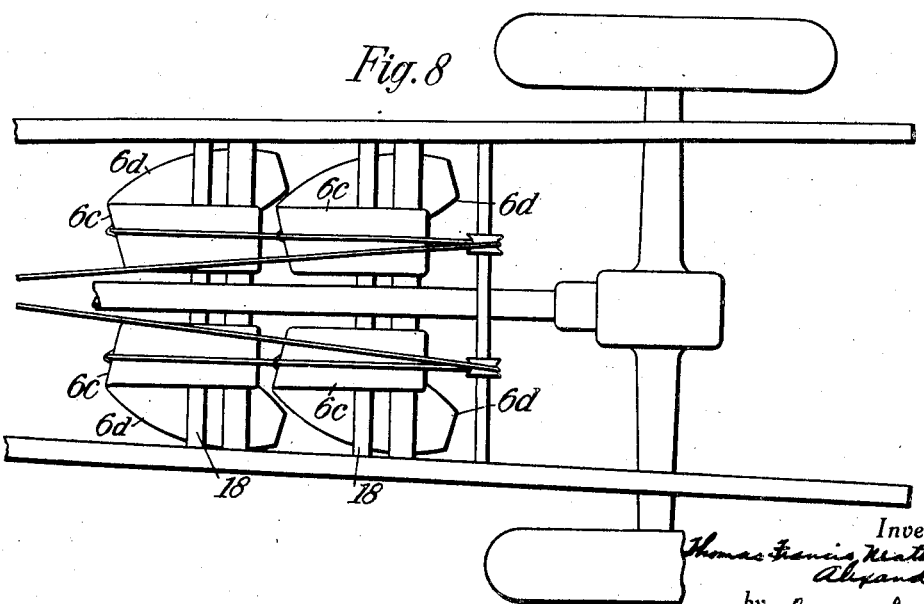

In the embodiment shown in Figs. 6, 7 and 8 two carriers 6ᶜ are employed similar to those of Figs. 1, 2 and 3 except that the braking surface is somewhat helical so that the parts 6ᵈ gradually encounter the roadway sideways as well as forwards as the vehicle's progress is being arrested. Each carrier 6ᶜ in moving from the position of Fig. 6 to the position of Figs. 7 and 8 encounters a beam 18 resiliently carried by springs 19 in side brackets 20 on the chassis. Although two sets of transverse carriers are in this example employed, it will be understood that one of the sets alone may be used.

Figure 9:
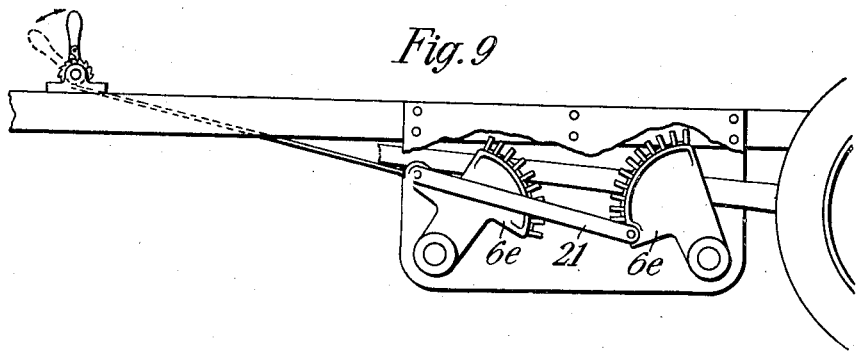
Figs. 9, 10 and 11 are similar views of a further embodiment.
Figure 10:
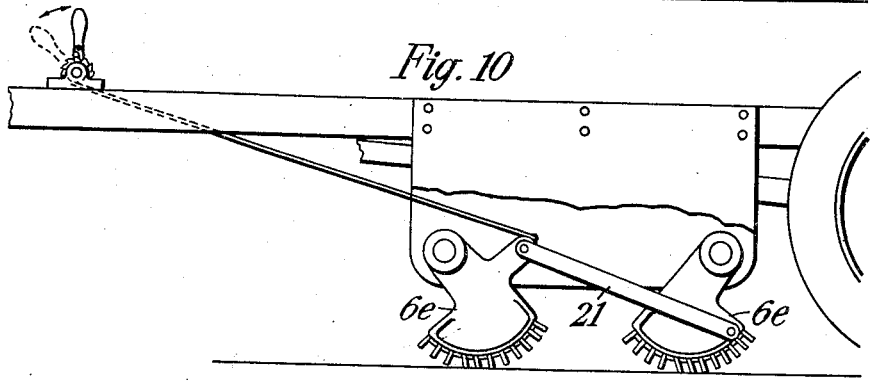
Figure 11:
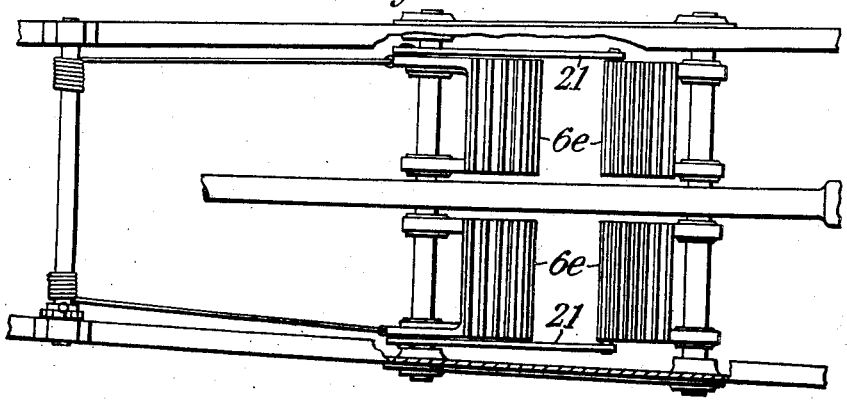

In the further embodiment shown in Figs. 9, 10 and 11 two sets of brush carriers 6ᵉ are made use of, cross connected by links 21 in such a way that the rearmost carriers encounter the road somewhat in advance of the leading carriers. In action the rearmost carriers tend to apply the brushes of the front carriers with ever increasing force whereas the latter tend to oppose the braking action of the rear brushes.

What I claim is:

1. For stabilising vehicles during braking, means comprising eccentric devices serving as brush carriers reacting between the vehicle and track with a force that increases automatically and resilient brush means carried by the eccentric devices to secure smoothness of action during dissipation of energy in effecting retardation.

2. Braking means according to claim 1 in which the eccentric carriers are of resilient construction.

3. Braking means according to claim 1 in which the eccentric devices are rigid.

4. Braking means according to claim 1 in which the eccentric carrier or carriers is or are resiliently mounted.

THOMAS FRANCIS NEATH ALEXANDER.